Oct. 7, 1969 G. L. WALLACE 3,471,020
SEWAGE TREATMENT APPARATUS
Filed Dec. 7, 1966

INVENTOR.
GORDON L. WALLACE

BY Woodard, Weikart, Emhardt & Naughton
Attorneys

United States Patent Office 3,471,020
Patented Oct. 7, 1969

3,471,020
SEWAGE TREATMENT APPARATUS
Gordon L. Wallace, Indianapolis, Ind., assignor, by mesne assignments, to Aquapure, Inc., Indianapolis, Ind., a corporation of Indiana
Filed Dec. 7, 1966, Ser. No. 599,845
Int. Cl. B01d 1/24; F26b 3/20
U.S. Cl. 210—152                                    7 Claims

ABSTRACT OF THE DISCLOSURE

The apparatus disclosed is a small capacity sewage disposal device in which sewage is shredded and pumped from an accumulator chamber onto a heat transfer place and is moved across the heated plate. This oxidizes the sludge and evaporates the water content of the sewage. A final chamber vents the steam and collects the residue fly-ash.

---

This invention relates generally to sewage treatment, and more particularly to apparatus suitable for the treatment of sewage.

There are numerous areas of the country where sanitary sewers are nonexistent, or economically inaccessible, and where soil conditions preclude the use of septic tanks. In such areas, especially where the population is sparse, for example in rural areas, the cost of installing a conventional sanitary sewer system and treatment plant is prohibitive. Much of the domestic waste in these areas is being discharged into streams, or into open ditches where it eventually finds its way to larger streams.

Although the volume of domestic waste from any one residence would not create a significant stream pollution problem, unless the stream were quite small, the cumulative effect of the domestic waste from even a small number of residences can cause considerable pollution. In addition, where open ditches are used, noxious odors are given off by the decaying waste and the ditches provide ideal breeding areas for mosquitos and other insect pests. The problem exists not only with regard to single domestic installations but also with regard to sewage disposal units for industrial wastes, and block-size or subdivision-size installations. Disposal units of smaller size are characterized by relatively high unit cost. The apparatus of the present invention, while capable of being economically built on a scale providing the relatively small capacity necessary for single, domestic installation, can also be increased in capacity so as to enable the processing of wastes from large industrial plants and from multiple-unit or subdivision home groupings.

It is therefore an object of this invention to provide an improved sewage treatment apparatus for the treatment of domestic or industrial waste.

It is a further object of this invention to provide an apparatus suitable for single residence use.

It is a still further object of this invention to provide an apparatus for the treatment of domestic waste which is fully automatic in operation.

A still further object of this invention is to provide an apparatus which is comparatively simple in operation, and can be readily serviced by a relatively unskilled person.

Yet another object of this invention is to provide an apparatus for the treatment of domestic waste that is rugged and will operate many years without major repairs.

These and other objects will become apparent as the description proceeds with reference to the accompanying drawings in which.

Figure 1:
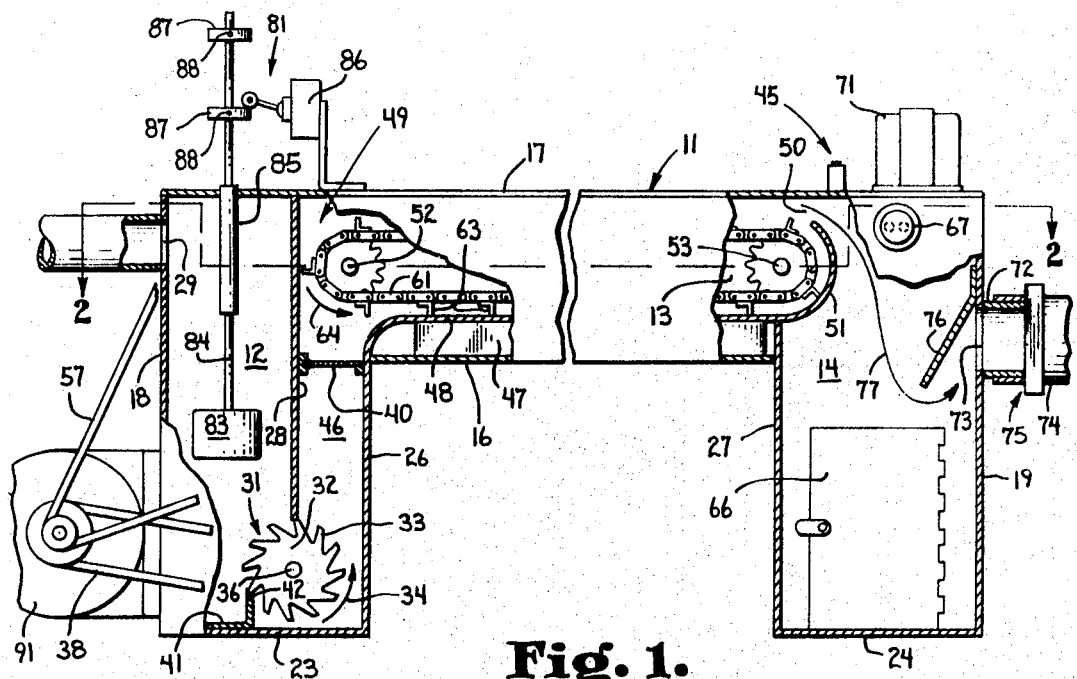
FIG. 1 is a side elevation of the apparatus partly in section.

In the preferred embodiment of the present invention, the apparatus is substantially enclosed in a generally inverted U-shaped housing 11 which is internally partitioned into a sewage accumulator section 12, a heating and oxidizing section 13, and a fly ash collector section 14, as best shown in FIG. 1.

Figure 2:
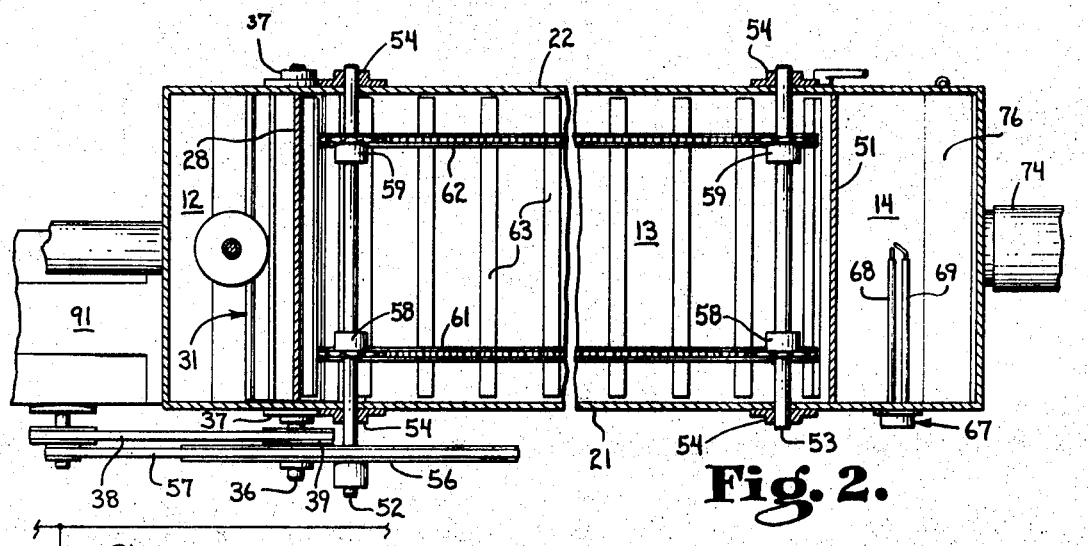
FIG. 2 is a top sectional view of the apparatus taken generally along the line 2—2 of FIG. 1.

The housing 11 has a top 17, end walls 18 and 19, side walls 21 and 22, a first bottom 23, a second bottom 24, center walls 26 and 27, and horizontal closure plate 16, as best shown in FIGS. 1 and 2.

The sewage accumulator section 12 is enclosed by a portion of the top 17, the end wall 18, a portion of the side wall 21, a portion of the side wall 22, the first bottom 23, and an internal partition 28. The internal partition 28 is affixed to the top 17, to the side wall 21 and to the side wall 22, and extends downwardly from the top 17 and separates the accumulator section from the heating and oxidizing section. An inlet opening 29 suitable for coupling to a tile or soil pipe admits sewage to the accumulator section 12.

Between the lower margin of the internal partition 28 and the bottom 23 is the shredding means indicated generally at 31. The shredding means 31 including a cylinder 32 having longitudinal vanes 33 inclined radially in the direction of rotation as indicated by the arrow 34. The cylinder 32 is mounted on a shaft 36 which is journaled in suitable bearings 37 mounted in the walls 21 and 22. The cylinder 32 and shaft 36 are rotated in the direction of the arrow 34 by a belt 38 and pulley 39 mounted on the shaft 36. A lip member 41 is affixed to the bottom 23 and is in close spaced relationship to the locus of the peripheral edges of the vanes 33. The lip member 41 which may be fabricated from angle iron, has a concave surface 42 which cooperates with peripheries of the vanes 33 to shred the sewage to form sludge. The vanes 33 cooperate with the lip member 41 to impart hydraulic head to the sludge sufficient to force it upward through the column 46 in the heating and oxidizing section 13.

The heating and oxidizing section 13 is generally L-shaped, is rectangular in cross section, and is enclosed by a portion of the top 17, a portion of the side wall 21, a portion of the side wall 22, and the heat transfer plate 48. One end of the heating and oxidizing section, indicated at 49, receives sludge from the column 46. The other end of the heating and oxidizing section is partially closed by the partial closure member 51, which will be described more fully subsequently. A baffle plate 40, hinged to the sidewall of column 46, permits flow into the section 13 but prevents any back-pressure reverse flow.

Figure 3:
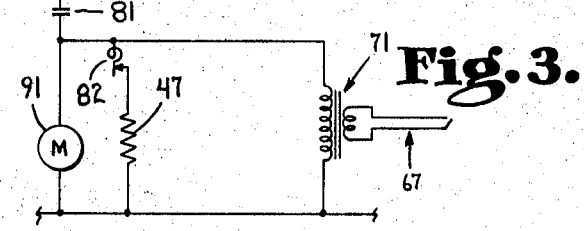
FIG. 3 is a schematic diagram of a control circuit for the apparatus.

Within the heating and oxidizing section 13 are two shafts 52 and 53, oriented parallel to the shaft 36 of the shredding means and journaled in suitable bearings 54 mounted in the side walls 21 and 22. The shaft 52 extends outwardly from the side wall 21 and has a pulley 56 mounted thereon to accept the belt 57. Two pairs of sprockets 58 and 59 are mounted on the shafts 52 and 53. One sprocket of each pair is mounted on each shaft as best shown in FIG. 2. An endless chain 61 is received upon the first pair of sprockets 58 and an endless chain 62 is received upon the other pair of sprockets 59. A plurality of scraper members 63 are affixed to alternate links of the chains 61 and 62 so that the scraper members 63 are at all times parallel to the shafts 52 and 53. The shafts 52 and 53, the pairs of sprockets 58, and 59, the chains 61 and 62 are so arranged that when the shaft 52 is driven by the pulley 56 in the direction of the arrow 64, the scraper members 63 scrape the heat transfer plate 48 to convey the sludge from left to right as viewed in FIG. 1. This scraping action not only conveys the sludge, but also keeps the heat transfer plate 48 substantially free of charred or caked sludge which has a very low coefficient of heat transfer and if allowed to accumulate on the heat transfer plate would substantially block the flow of heat to the sludge. Heat is supplied to the heat transfer plate 48 by a heat source 47, preferably an electrical resistance heater as indicated in FIG. 3, mounted between the heat transfer plate 48 and the horizontal closure plate 16.

As the sludge is scraped along the heat transfer plate 48 by the scraper members 63, it is dried and oxidized into fly ash. The steam formed by this process creates a slight pressure within the heating and oxidizing section. The steam cannot escape to the accumulator section because of the sludge in the column 46, and is forced to exhaust rightwardly as viewed in FIG. 1 through the opening 50 above the partial closure member 51. When the sludge and fly ash reach the right end of the heat transfer plate 48, as viewed in FIG. 1, the partial closure member 51 forces them upwardly and leftwardly. The fly ash is then carried rightwardly by the flow of steam through the opening 50 and the sludge not oxidized to fly ash is carried leftwardly where it falls back to the heat transfer plate 48 and is eventually oxidized to fly ash.

The fly ash carried through the opening 50 by the steam falls out and is collected in the fly ash collector section 14.

The fly ash collector section 14 is enclosed by the end wall 19, a portion of the side wall 21, a portion of the side wall 22, the bottom 24, and the center wall 27. The fly ash collector section is provided with a door 66 for the removal of accumulated fly ash.

The fly ash collector section 14 may be provided with an igniter 67 for igniting and burning any combustible gases given off when the sludge is dried and oxidized and further provided with a pressure release safety valve 45. In the preferred embodiment an electrical spark igniter is used. There are two electrodes 68 and 69 insulatedly mounted to the sidewall 21 as shown in FIG. 2. Appropriate voltage for the electrodes is supplied by the transformer 71.

The fly ash collector section 14 is also provided with a vent 73 and sleeve 72 whereby the steam and burnt gases are discharged into the atmosphere. Suitable ducting 74 may be connected to the sleeve 72 in order to carry the steam and burnt gases away from the location where the apparatus is installed.

Also mounted in the fly ash collector section 14 is a baffle 76 which aids separation of the fly ash from the flow of steam and burnt gases causing it to precipitate to the bottom of the fly ash collector section and not be carried to the atmosphere by the steam and burnt gases. In the preferred embodiment of the invention, the baffle 76 is a single baffle plate affixed to the wall 19 above the vent 73 and extending downwardly and away from the wall 19 and having its lower edge below the bottom of the vent 73. This configuration causes the steam and burnt gases to flow generally in the direction of the arrow 77. When the steam enters the fly ash collector section through the opening 50, it has a relatively high velocity and easily carries the fly ash with it into the fly ash collector section. However, because of the large cross sectional area of the fly ash collector section, the velocity is greatly decreased, causing the fly ash to precipitate. However, the velocity again increases as the steam enters the vent 73, and were it not for the baffle 76, a considerable amount of fly ash would be carried into the vent 73 before it had reached the bottom of the fly ash collector section and would be discharged into the atmosphere. A filter, shown schematically at 75 in FIG. 1, may be provided in the outlet duct 74 to trap any residual fly ash which might be carried to the outlet duct.

Control means in the form of a float switch 81 may be provided in the sewage accumulator section 12 for controlling the operation of the shredding means and the heating means. It may also be desirable to include a thermostat 82 for control of the heat source 47 of the heating means. In the preferred embodiment of the present invention, the float switch 81 includes a float 83, supported on a rod 84 slidable within a sleeve 85 mounted in the top 17. An electric switch 86 is operated by the switch arms 87 mounted on the rod 84. The switch arms 87 are mounted to the rod 84 with set screws 88 and may be located higher or lower on the rod 84 to provide the desired operation.

An electric motor 91 is mounted on the housing 11 as shown in FIG. 1, and, by means of belts 38 and 57, drives the shaft 36 of the shredding means and shaft 52 of the heating means, respectively.

The heat source 47 may be either gas, electric or oil fired. Similarly, a gasoline engine may be used instead of the electric motor 91. This would be desirable in locations where electricity is not available. In the event a gasoline engine were used, the control means could take on many forms such as hydraulic or pneumatic, and be used to control a clutch on the gas engine shaft or to control automatic starting and stopping of the gas engine in cooperation with a storage battery or compressed air.

In operation, sewage flows into the sewage accumulator section 12. When the level of accumulated sewage reaches a predetermined depth, the float switch 81 is actuated and turns on the shredding means and the heating means. The shredding means 31 shreds the sewage to sludge and pumps it through the column 46 to the heating means where the scraper members 63 rake the sludge over the heat transfer plate 48 which is heated by the heat source 47. The sludge is dried and oxidized by the heat transferred to it from the heat transfer plate 48 and gives off steam, carbon dioxide, and some combustible gases. The steam and gases exit through the opening 50, carrying along the sludge which has been oxidized to fly ash. Sludge which has not been oxidized to fly ash is returned to the heat transfer plate 48 by the action of the scraper members 63 and the partial closure member 51. The fly ash is precipitated in the fly ash collector section 14. Precipitation is aided by the baffle 76. The combustible gases are ignited and burned by the igniter 67. Steam and burnt gases exit through the vent 73 and are discharged to the atmosphere.

It will be seen that the present invention provides an improved sewage treatment apparatus suitable for the treatment of domestic sewage and which is suitable for single residence use. The operation is fully automatic, except for periodic removal of fly ash from the apparatus. The apparatus is comparatively simple in construction and in operation and can be readily serviced by a relatively unskilled person. Further, the apparatus is rugged and will operate for great lengths of time without major repairs.

The invention claimed is:
1. Treatment apparatus for sewage comprising:
 (a) accumulator means for accumulating sewage;
 (b) shredding means for receiving said sewage from said accumulator means and for shredding said sewage into sludge;
 (c) heating means for receiving said sludge from said shredding means, raising the temperature of said sludge sufficiently to evaporate the water content thereof thereby forming dried sludge and steam, and further raising the temperature of said dried sludge sufficiently to oxidize said dried sludge to form fly ash; and
 (d) separating and collecting means for receiving said steam and said fly ash from said heating means, separating said fly ash from said steam, collecting said fly ash and venting said steam to the atmosphere,
said heating means including a heat transfer plate, a heat source for heating said heat transfer plate, scraper members for scraping said heat transfer plate and for propelling said sludge across said heat transfer plate, said heat transfer plate acting to transfer heat to said sludge thereby raising the temperature of said sludge.

2. The invention of claim 1 wherein said heating means includes a second driven shaft and a third shaft parallel to said first shaft and mounted for rotation, two pairs of sprockets affixed in spaced relationship on said two shafts, one sprocket of each pair being mounted on each of said two shafts, two endless chains, one of said chains being received upon one pair of said sprockets and the other chain being received upon the other pair of sprockets, said scraper members being affixed to the links of said two chains in parallel relationship such that when one of said second driven shaft is rotated said scraper members will move across and scrape said heat transfer plate.

3. The invention of claim 2 wherein said shredding means includes a vaned impeller mounted for rotation on a driven shaft, and a lip member mounted in close spaced relationship to said impeller, said impeller being cooperable with said lip member to receive said sewage from said accumulator means, to shred said sewage into sludge, and to impart sufficient hydraulic head to said sludge to convey said sludge to said heating means.

4. The invention of claim 3 wherein said collecting and separating means includes a receptacle for collecting said fly ash, said receptacle having a vent for discharging said steam to the atmosphere and a door for removing accumulated fly ash from said receptacle, a baffle plate affixed within said receptacle and adapted to deflect the flow of said steam and fly ash from passing directly through said receptacle to said vent, thereby aiding the separating of said fly ash from said steam.

5. The invention of claim 3 further comprising drive means for driving said first driven shaft and said second driven shaft.

6. The invention of claim 5 further comprising control means including a first electrical switch for turning on and turning off said drive means, said switch being responsive to the level of sewage in said accumulator means and acting to turn on said drive means at a first predetermined level and to turn off said drive means at a second predetermined level.

7. The invention of claim 6 wherein said control means includes a second electrical switch for turning on and turning off said heat source, said switch being responsive to the temperature of said heat transfer plate and acting to turn on said heat source when the temperature is below a first predetermined value and to turn off said heat source when said temperature is above a second predetermined value.

References Cited

UNITED STATES PATENTS

| | | | |
|---|---|---|---|
| 1,329,727 | 2/1920 | Smith | 210—152 X |
| 2,094,909 | 10/1937 | Baily et al. | 210—152 X |
| 2,330,542 | 9/1943 | Barnebl et al. | 210—152 X |
| 2,792,117 | 5/1957 | Laboon | 210—187 X |

JAMES L. DECESARE, Primary Examiner

U.S. Cl. X.R.

210—121, 179, 526